United States Patent
Schuppe et al.

(10) Patent No.: US 10,579,775 B2
(45) Date of Patent: Mar. 3, 2020

(54) TILE-CELL INTERPOLATION

(71) Applicant: Arm Limited, Cambridge (GB)

(72) Inventors: Vincent Philippe Schuppe, Austin, TX (US); Syam Kumar Lalitha Gopalakrishnan Nair, Pleasanton, CA (US); Hongwei Zhu, San Jose, CA (US); Neeraj Dogra, Gilroy, CA (US); Mouli Rajaram Chollangi, Fremont, CA (US); Arjun R. Prasad, Bangalore (IN)

(73) Assignee: Arm Limited, Cambridge (GB)

( * ) Notice: Subject to any disclaimer, the term of this patent is extended or adjusted under 35 U.S.C. 154(b) by 41 days.

(21) Appl. No.: 16/033,158

(22) Filed: Jul. 11, 2018

(65) Prior Publication Data

US 2020/0019669 A1 Jan. 16, 2020

(51) Int. Cl.

| G11C 13/00 | (2006.01) |
|---|---|
| G11C 29/08 | (2006.01) |
| G06F 17/50 | (2006.01) |
| H01L 27/02 | (2006.01) |
| G11C 11/412 | (2006.01) |
| H01L 27/11 | (2006.01) |

(52) U.S. Cl.
CPC ...... *G06F 17/5081* (2013.01); *G06F 17/5009* (2013.01); *G06F 17/5045* (2013.01); *G11C 11/412* (2013.01); *H01L 27/0207* (2013.01); *H01L 27/1104* (2013.01)

(58) Field of Classification Search
CPC ..... G11C 11/22; G11C 11/221; G11C 11/406; G11C 11/418; G11C 7/10; G11C 13/004; G11C 13/0069; G11C 19/28; G11C 11/419; G11C 11/5685; G11C 13/0002; G11C 13/0061; G11C 16/0458
See application file for complete search history.

(56) References Cited

U.S. PATENT DOCUMENTS

| 8,239,735 | B2* | 8/2012 | Shalvi | G11C 16/349 714/774 |
|---|---|---|---|---|
| 2002/0097621 | A1* | 7/2002 | Fujiwara | G11C 16/0466 365/204 |
| 2009/0154278 | A1* | 6/2009 | Chan-Choi | G11C 8/10 365/222 |
| 2015/0346742 | A1* | 12/2015 | Kapoor | G06F 1/32 327/540 |
| 2016/0005463 | A1* | 1/2016 | Park | G11C 13/0021 365/148 |

\* cited by examiner

*Primary Examiner* — Hien N Nguyen
(74) *Attorney, Agent, or Firm* — Pramudji Law Group PLLC; Ari Pramudji

(57) ABSTRACT

Various implementations described herein are directed to a method that identifies a memory instance with multiple tile-cells. The memory instance has memory instance leakage data, and each tile-cell of the multiple tile-cells has tile-cell leakage data. The method subdivides the multiple tile-cells into multiple categories based on a relationship between the memory instance leakage data and the tile-cell leakage data. The method obtains measured leakage data for each tile-cell of the multiple tile-cells by simulating the memory instance based on the memory instance leakage data and the tile-cell leakage data for each category of the multiple categories. The method determines a combined leakage of the memory instance by combining the measured leakage data for each tile-cell of the multiple tile-cells.

20 Claims, 13 Drawing Sheets

TILE-CELL INTERPOLATION

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Memory compilers take user configuration and assemble tile-cells to generate a memory instance. Traditional memory compilers are built by mining characterized data for hundreds of memory instances to cover an entire memory compiler space. Data for a memory instance is typically calculated as a sum of individual tile-cells. However, the tile-cells have different placement in different memory instances, which may result in different charge/discharge paths, resistance-capacitance (RC), etc. Unfortunately, this traditional technique may introduce accuracy errors in memory instance data. Sometimes leakage, timing, power and noise data for hundreds of instances is stored, and a memory compiler analyzes hundreds of instances with semi-automatic vectors related to the entire memory circuit, gathers results and computes a final result. However, this technique is costly, time consuming and inefficient. These techniques can cause accuracy errors because some tile-cells are sensitive to a number of rows (e.g., bitcells, columns, and wordline drivers).

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein are directed to tile-cell interpolation, including memory compiler characterization with interpolation of tile-cell data. Schemes and techniques described herein provide for harnessing tile-cell data for usage in memory compilers and for generating electronic design automation (EDA) based memory circuits by applying interpolation of tile-cell data. Schemes and techniques described herein may be used to characterize tile-cells for a set of selected instances. The data of the tile-cells may be associated with specific memory instances, and the memory compiler interpolates the characterized tile-cell data to obtain the instance tile-cell data and then calculates the leakage data of a full instance. This may provide accurate results without high cost.

Given words, bits, and other configurations, a memory compiler assembles tile-cells into a physical circuit for a memory instance. The memory compiler also generates various circuit behavioral data, such as, e.g., leakage/timing/power/noise characteristics, for the memory instance. Generally, the memory compiler may generate many instances, and it may be difficult, inefficient and overwhelming for the memory compiler to generate and store behavioral data for each and every instance. As such, various implementations described herein refer to schemes and techniques to harness tile-cell data for usage by a memory compiler to thereby develop and produce more accurate data. These schemes and techniques described herein are based on interpolation/curve-fitting of tile-cell data along with or instead of interpolation/curve-fitting of only memory instance data.

Various implementations described herein refer to characterizing tile-cell data for a set of selected memory instances. The data of the tile-cells may be associated with corresponding memory instances. When a memory compiler generates leakage data for a given memory instance, the memory compiler retrieves the tile-cell data from a database and applies interpolation to obtain tile-cell data for the given memory instance. Then, the memory compiler calculates the leakage data for the full memory instance using tile-cell interpolation data. The memory compiler may generate timing/power circuit behavior with accuracy with less cost due to full memory instance characterization.

In some implementations, various schemes and techniques described herein provide for characterizing tiles-cells and/or tile-cell leakage data into smaller categories for more efficient circuit design, analysis, modeling, data storage and production. In other implementations, various schemes and techniques described herein may also provide for interpolation of tile-cell leakage data for larger memory instances for more efficient circuit design, analysis, modeling, data storage and production.

Various implementations of tile-cell interpolation will now be described in detail herein with reference to FIGS. 1A-10.

Figure 1A:
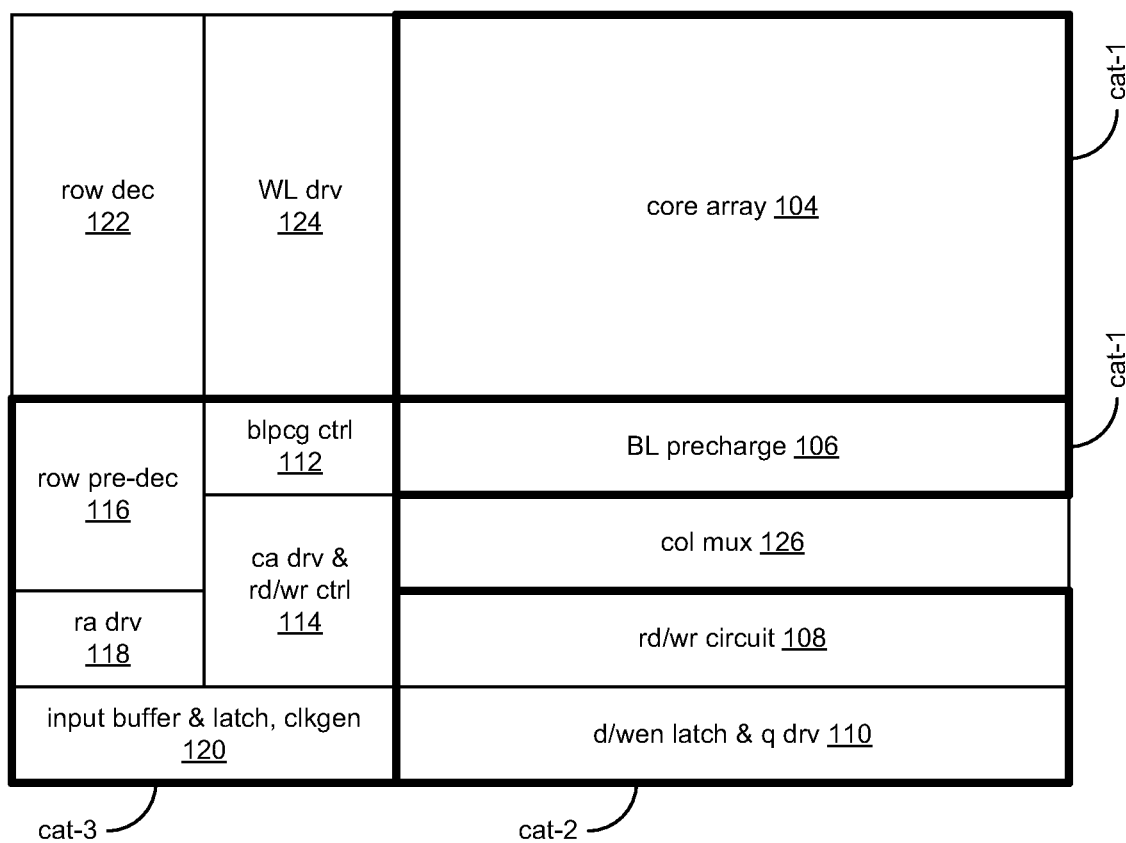
FIGS. 1A-1C illustrate various diagrams of memory instances formed of tile-cells in accordance with various implementations described herein.
Figure 1B:
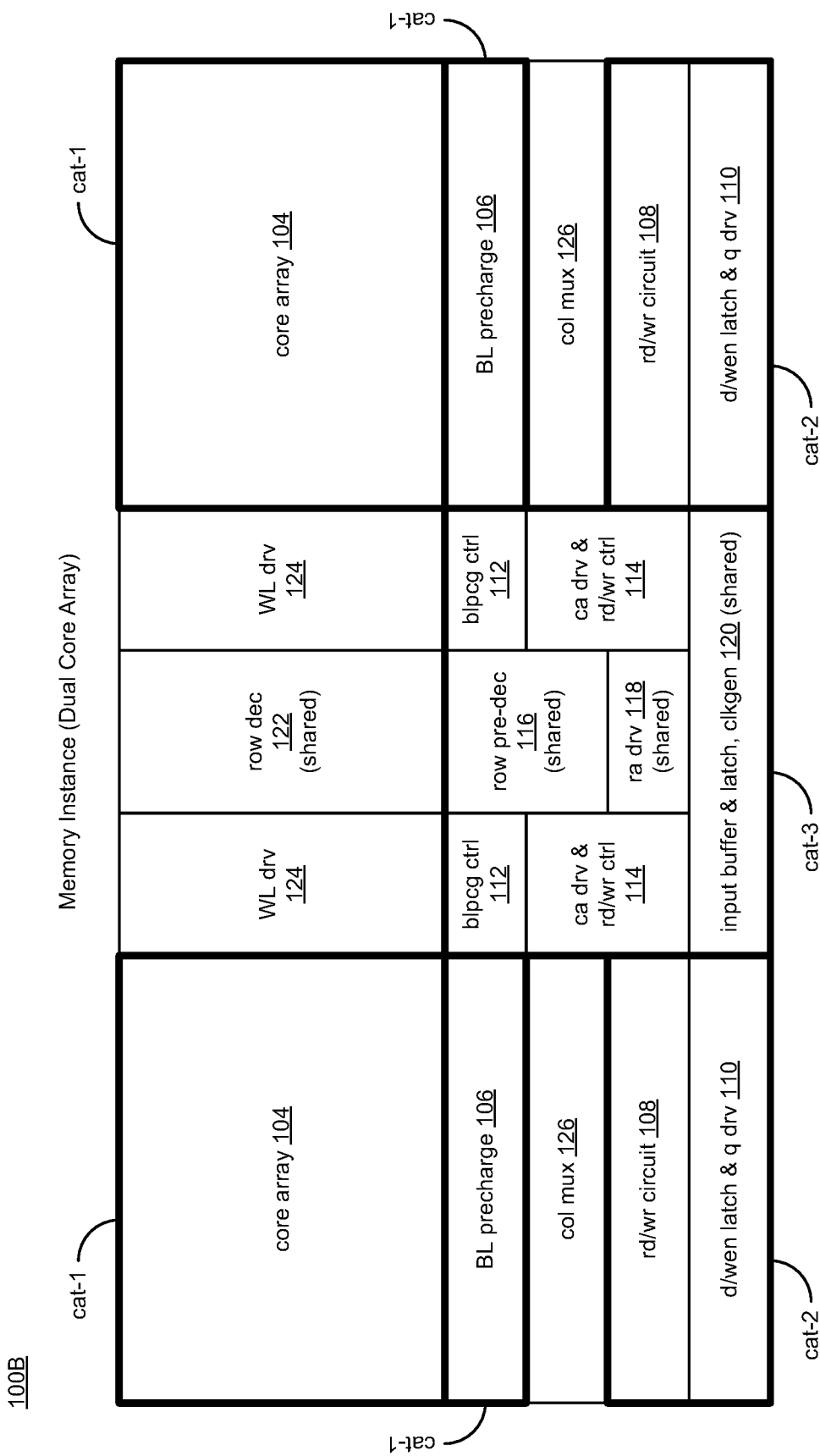
Figure 1C:
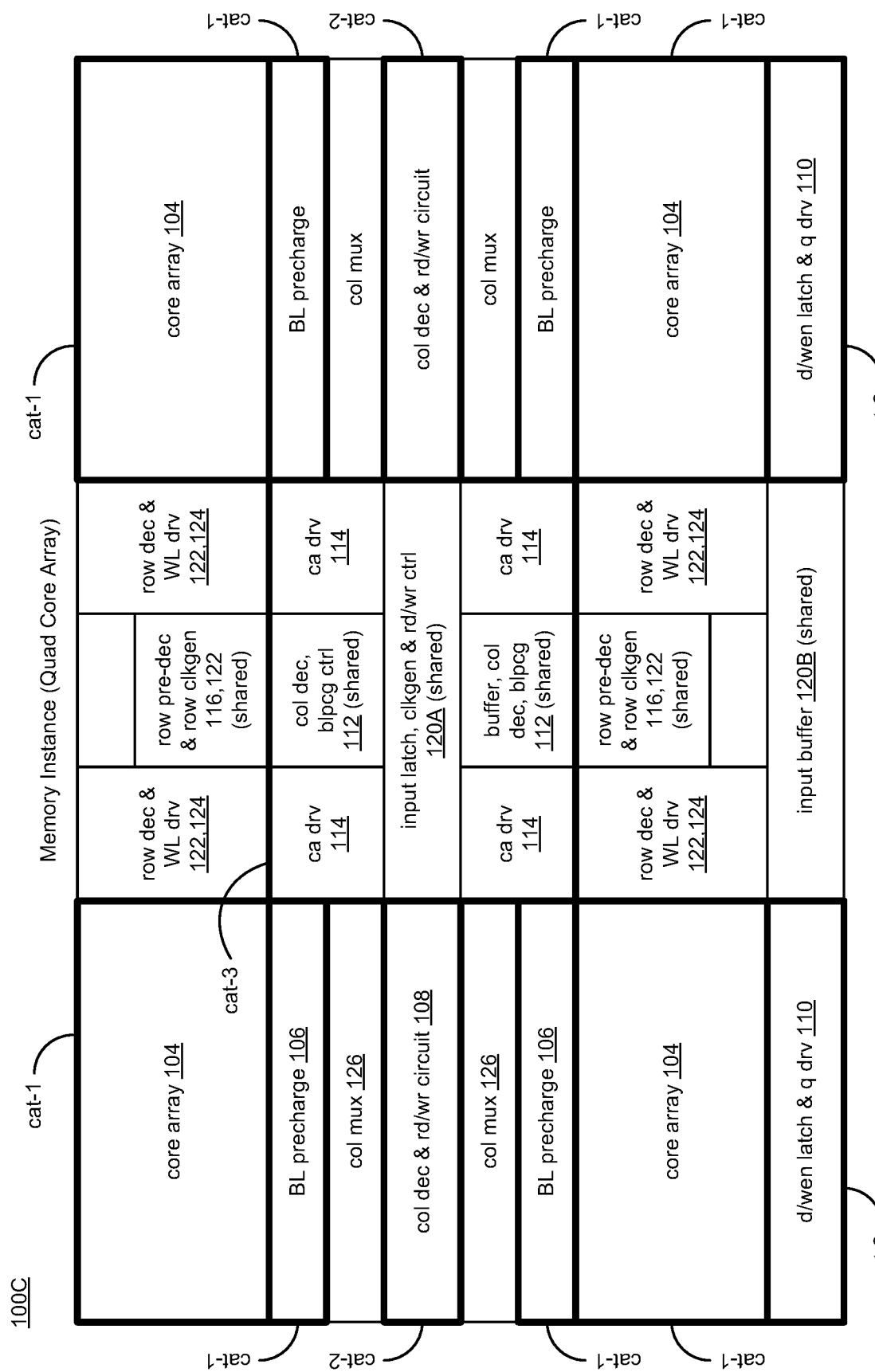

FIGS. 1A-1C illustrate various diagrams of memory instances formed of tile-cells in accordance with various implementations described herein. In particular, FIG. 1A illustrates a block diagram of a memory instance 100A formed of tile-cells having a single core array, FIG. 1B illustrates a block diagram of another memory instance 100B formed of tile-cells having a dual core array, and FIG. 1C illustrates a block diagram of another memory instance 100C formed of tile-cells having a quad core array. The various memory instances 100A, 100B, 100C may be implemented as an integrated circuit (IC) in memory applications using various types of memory related components. Also, various components described in FIGS. 1B-1C are similar in scope, function, and operation as described in reference to the memory circuitry 100A as shown in FIG. 1A.

As shown in FIG. 1A, the memory instance 100A may be implemented with memory circuitry having blocks with multiple categories of tile-cells that are arranged to provide various memory related components. The memory instance 100A may include a first category (cat-1) of tile-cells that are arranged to provide core array circuitry 104 along with bitline (BL) precharge circuitry 106. The memory instance 100A may be implemented with memory circuitry having a single core array 104 as a single bank of tile-cells, wherein each tile-cell may be referred to as a memory cell or bitcell. Each bitcell may be configured to store at least one data bit value (e.g., data value related to a logical '0' or '1'). Also, the single core array 104 includes any number of bitcells arranged in various configurations, such as, e.g., a two-dimensional (2D) memory array having any number of columns and any number of rows of multiple bitcells, which may be arranged in a 2D grid pattern with 2D indexing capabilities. Each bitcell may be implemented with random access memory (RAM) circuitry, and/or some other type of volatile-cell type memory. For instance, each bitcell may include a multi-transistor static RAM (SRAM) cell, including various types of SRAM cells, such as, e.g., 6T CMOS SRAM (e.g., as shown in FIG. 2B) and/or other types of complementary MOS (CMOS) SRAM cells, such as, e.g., 4T, 8T, 10T, or more transistors per bit. In some instances, the memory instance 100 may operate at a source voltage level Vdd with a voltage range that varies with technology.

The memory instance 100A may include a second category (cat-2) of tile-cells that are coupled to the first category (cat-1) of tile-cells, and the second category (cat-2) of tile-cells are arranged to provide read-write circuitry 108 (i.e., rd/wr circuit) for accessing data stored in memory cells of the core array circuitry 104. The read-write circuitry 108 may also include latch and output drive circuitry 110 (i.e., d/wen latch & q drv).

The memory instance 100A may include a third category (cat-3) of tile-cells that are coupled to the first category (cat-1) of tile-cells and the second category (cat-2) of tile-cells, and the third category (cat-3) of tile-cells are arranged to provide control circuitry 112, 114 for controlling access to the data stored in the memory cells of the core array circuitry 104 and for controlling operation of the read-write circuitry 108. The control circuitry 112, 114 may include bitline precharge control (i.e., blpcg) 112 and column driver (i.e., ca drv) and read-write control 114 (i.e., rd/wr ctrl) along with a row predecoder 116 (i.e., row pre-dec), a row driver 118 (i.e., ra dry), and an input buffer and latch along with clock generation 120 (i.e., input buffer & latch, clkgen).

The memory instance 100A may also include a row decoder 122 (i.e., row dec), a wordline driver 124 (i.e., WL dry), and a column multiplexer 126 (i.e., col mux), which may or may not be part of the multiple categories (cat-1, cat-2, cat-3) of tile-cells. In some instances, the row decoder 122 (i.e., row dec) may be used to access each of the bitcells via a selected wordline (WL) that is driven by the wordline driver 124 (i.e., WL dry). Also, the combination of the row decoder 122 (i.e., row dec) and the wordline driver 124 (i.e., WL drv) may be referred to as (wdx).

The column multiplexer 126 (i.e., col mux) may be used to access each of the bitcells via one or more selected bitlines BL, . . . , BLn. In some instances, the selected bitlines BL, . . . , BLn may include a selected pair of complementary bitlines BL/NBL, . . . , BLn/NBLn. The row decoder 122 (i.e., row dec) may be coupled to the wordline driver 124 (i.e., WL drv) and the column multiplexer 126 (i.e., col mux) to select at least one bitcell in the core array 104 with a wordline (WL) signal and a bitline (BL) signal. Also, the column multiplexer 126 (i.e., col mux) and/or components associated therewith (e.g., 106, 108 110) may receive one or more data signals (D) and one or more other I/O signals (Q) that are associated reading and writing data to the bitcells in the core array 104.

In some implementations, a combination of the first category (cat-1) of tile-cells, the second category (cat-2) of tile-cells, and the third category (cat-3) of tile-cells pertain to the memory instance 100A having a combined leakage associated with each tile-cell in each category (cat-1, cat-2, cat-3) of the combination.

The first category (cat-1) of tile-cells may refer to one or more types of tile-cells that are used once or multiple times in the memory instance 100A. In some instances, tile-cell leakage data may be associated with the first category (cat-1) tile-cells, and the tile-cell leakage data may be non-static meaning dependent on its use context. Also, the tile-cell leakage data for each tile-cell in the first category (cat-1) may be obtained by determining measured leakage data for the memory instance 100A via interpolating the tile-cell leakage data for each tile-cell in the first category (cat-1) using tile-cell leakage data for each category (cat-1, cat-2, cat-3) of the combination.

The second category (cat-2) of tile-cells may refer to one or more types of tile-cells that are used multiple times in the memory instance 100A, and the tile-cell leakage data may be static meaning independent of its use context. In some instances, the tile-cell leakage data for each tile-cell in the second category (cat-2) may be obtained by determining an average measured leakage data for the memory instance 100A via averaging the tile-cell leakage data for each tile-cell in the second category (cat-2).

The third category (cat-3) of tile-cells may refer to one or more types of tile-cells that are used only once in the memory instance 100A, and the tile-cell leakage data may be obtained by direct measurement.

The memory instance 100A shown in FIG. 1A may include multiple memory instances, e.g., as shown in FIGS. 1B and 1C. For instance, FIG. 1B shows a block diagram of another memory instance 100B formed of tile-cells having a dual core array, and FIG. 1C illustrates a block diagram of another memory instance 100C formed of tile-cells having a quad core array.

As shown in FIG. 1B, the memory instance 100B may include a first memory instance and a second memory instance (e.g., multiple core arrays 104 in a dual memory core configuration), and the first and second memory instances may share one or more tile-cells, such as, e.g., row dec 122, row pre-dec 116 ra dry 118, and input buffer & latch, clkgen 120, which represent shared components.

As shown in FIG. 1C, the memory instance 100C may include four memory instances (e.g., multiple core arrays 104 in a quad memory core configuration), and the four memory instances may share one or more tile-cells, such as, e.g., row pre-dec & row clk gen 116, 122, col dec, blpcg ctrl 112, input latch, clkgen & rd/wr ctrl 120A, and input buffer 120B, which represent shared components.

Figure 2A:
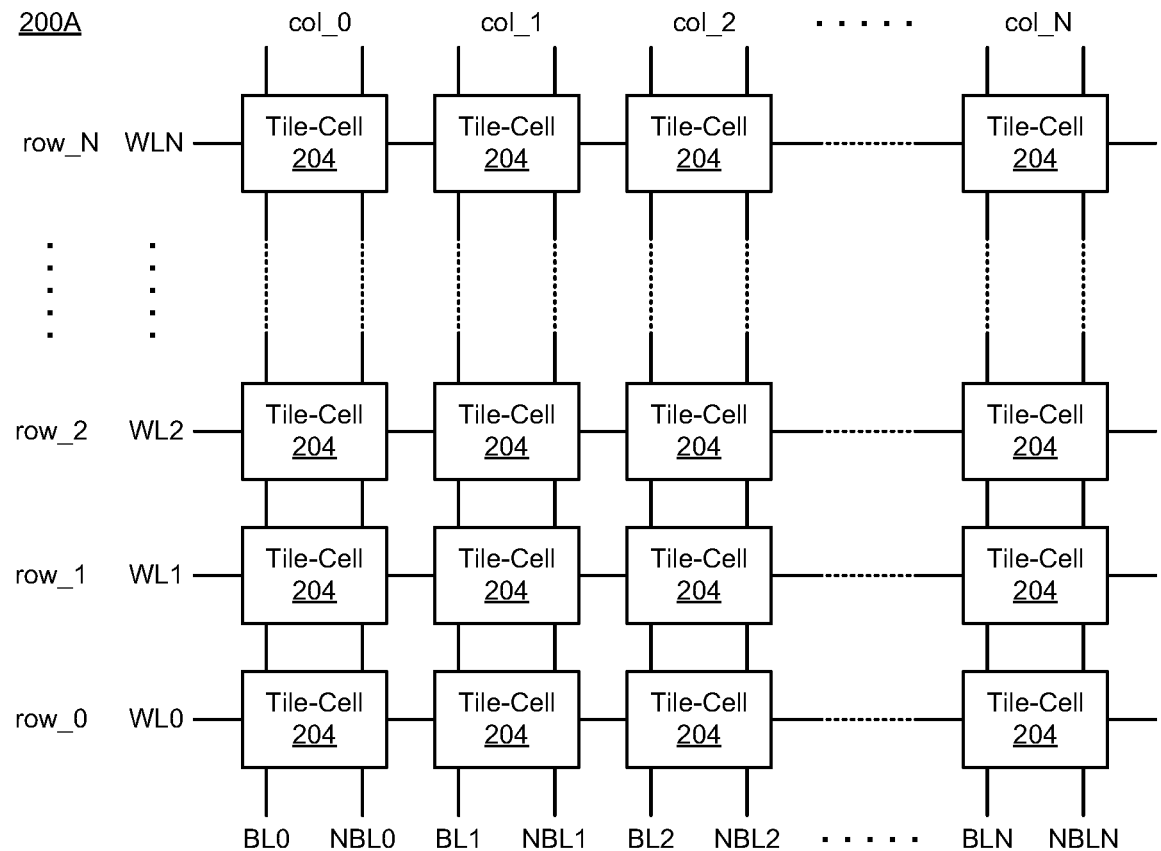
FIGS. 2A-2B illustrate various diagrams of tile-cell circuitry in accordance with various implementations described herein.
Figure 2B:
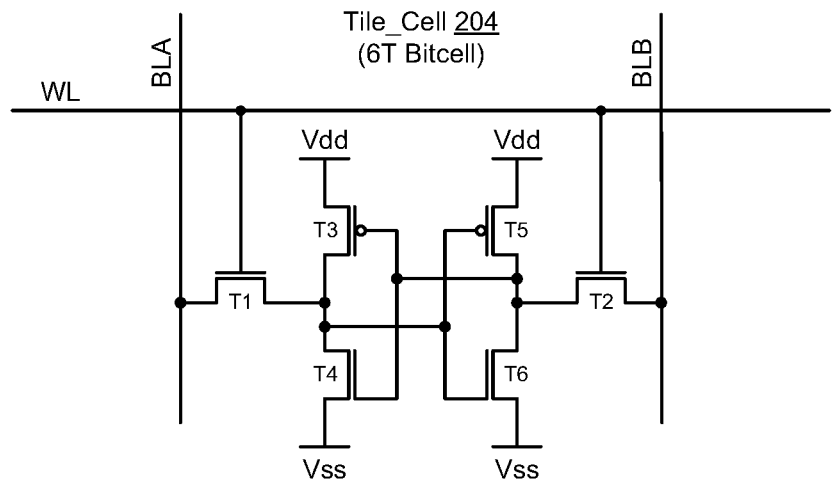

FIGS. 2A-2B illustrate various diagrams of tile-cell circuitry in accordance with various implementations described herein. In particular, FIG. 2A illustrates a diagram of tile-cell circuitry 200A having an array of tile-cells 204 (bitcells), and FIG. 2B illustrates a diagram of tile-cell circuitry 200B having a single tile-cell 204 (bitcell). The various tile-cell circuitry 200A, 200B, 200C may be referred to as memory architecture.

As shown in FIG. 2A, the tile-cell circuitry 200A may be implemented as the array of tile-cells 204 (bitcells) in a memory instance, such as, e.g., the core array 104 in FIGS. 1A-1C. The core array 204 may include columns of bitcells (col_0, col_1, col_2 . . . , col_N) that are accessible via corresponding wordlines (WL0, WL1, WL2, . . . , WLN) and corresponding bitlines (BL0/NBL0, BL1/NBL1, BL2/NBL2, . . . , BLN/NBLN), which are complementary bitlines (BL/NBL). The array of tile-cells 204 (bitcells) may include any number of tile-cells 204 (bitcells) arranged in various configurations, such as, e.g., a two-dimensional (2D) array having any number (N) of columns (col_0, col_1, col_2, . . . , col_N) and any number (N) of rows (row_0, row_1, row_2, . . . , row_N) of tile-cells 204 (bitcells), which may be arranged in a 2D grid pattern with 2D indexing capabilities.

As shown in FIG. 2B, each tile-cell 204 (bitcell) in the tile-cell circuitry 200A may be implemented with a multi-transistor static RAM (SRAM) cell, including various types of SRAM cells, such as, e.g., 6T CMOS SRAM (e.g., 6 transistors T1, T2, T3, T4, T5, T6, as shown in FIG. 2B) and/or other types of complementary MOS (CMOS) SRAM cells, such as, e.g., 4T, 8T, 10T, or more transistors per bit. Each each tile-cell 204 (bitcell) may be configured to store at least one data bit value (e.g., data value related to a logical '0' or '1'). Further, each tile-cell 204 (bitcell) may be implemented with random access memory (RAM) circuitry, and/or some other type of volatile-cell type memory.

The memory instances 200A, 200B may be implemented as integrated circuits (ICs) in using various types of memory, such as, e.g., random access memory (RAM), including static RAM (SRAM), and/or any other types of volatile memory. In some cases, the memory instances 200A, 200B may be implemented as an IC with dual rail memory architecture and related circuitry. The memory instances 200A, 200B may be integrated with computing circuitry and related components on a single chip. The memory instances 200A, 200B may be implemented in embedded systems for various electronic and mobile applications, including low power sensor nodes for IoT (Internet of things) applications.

Generally, a memory compiler is used to access a library of memory building blocks, such as, e.g., blocks and tile-cells as shown in FIGS. 1A-1C and 2A-2B including bit-cells, arrays, drivers, sense amplifiers, control circuits, decoders, multiplexers, etc. The memory compiler may be configured to generate and tile various physical views to build memory instances, e.g., as shown in FIGS. 1A-1C and 2A-2B. During design stages, the memory compiler may interface with a user to receive user input in reference to words, bits, multiplexing, and various other options. With the various input, the memory compiler may build memory instances and EDA views for implementation and manufacture.

Leakage power refers to the power consumed by unintended leakage that does not contribute to the integrated circuit's (IC's) function. This may become a concern for system-on-a-chip (SoC) designers in deep submicron process technology nodes (e.g., 65 nm and below), and this has increased the total SoC power consumption. Therefore, accurately modeling leakage in a memory compiler is often desirable. Various schemes and techniques to harness tile-cell data for usage in memory compilers is described herein to produce accurate tile-cell leakage data. These schemes and techniques use interpolation and/or curve-fitting of tile-cell data to meet high accuracy characterization.

As described herein, one or more or all possible tile-cells (or tile-cell types) used in memory design may be classified into multiple categories (e.g., 3 categories) based on their leakage dependency for specific use cases. The characterization methods provided herein may be tailored particularly to specific categories to ensure simulation accuracy as well as efficiency. For instance, in a first category (cat-1), each tile-cell type may be used once or multiple times in a memory instance, and the leakage data of the tile-cells may be referred to as "non-static" meaning dependent on its specific use context, such as, e.g., dependent on a row number in a memory instance.

In a second category (cat-2), each tile-cell type may be used multiple times in a memory instance, and the leakage data of the tile-cells may be referred to as "static" meaning independent of its specific use context. In this instance, a single leakage value of the tile-cell type may be obtained by averaging multiple leakage data related to this tile-cell type, e.g., as measured in one or more memory instances. Thus, leakage data of the second category (cat-2) of tile-cells may be be generated in a quick fashion. Further, in a third category (cat-3), each tile-cell type may be used only once in a memory instance, and leakage data may be obtained by direct measurement.

In some implementations, a small set of reference memory instances that cover one or more or all possible tile-cell types may be simulated. In such a way, the leakage of tile-cell types in the second and third categories may be obtained. Also, each tile-cell type of the first category may be measured in a context of the reference memory instance to produce reference tile-cell data. In some instances, when generating a desired memory instance, the reference tile-cell data may be interpolated to produce leakage data of a particular memory size. By taking its use context into consideration, the leakage data of the first category of tile-cells may be obtained with high accuracy.

Figure 3:
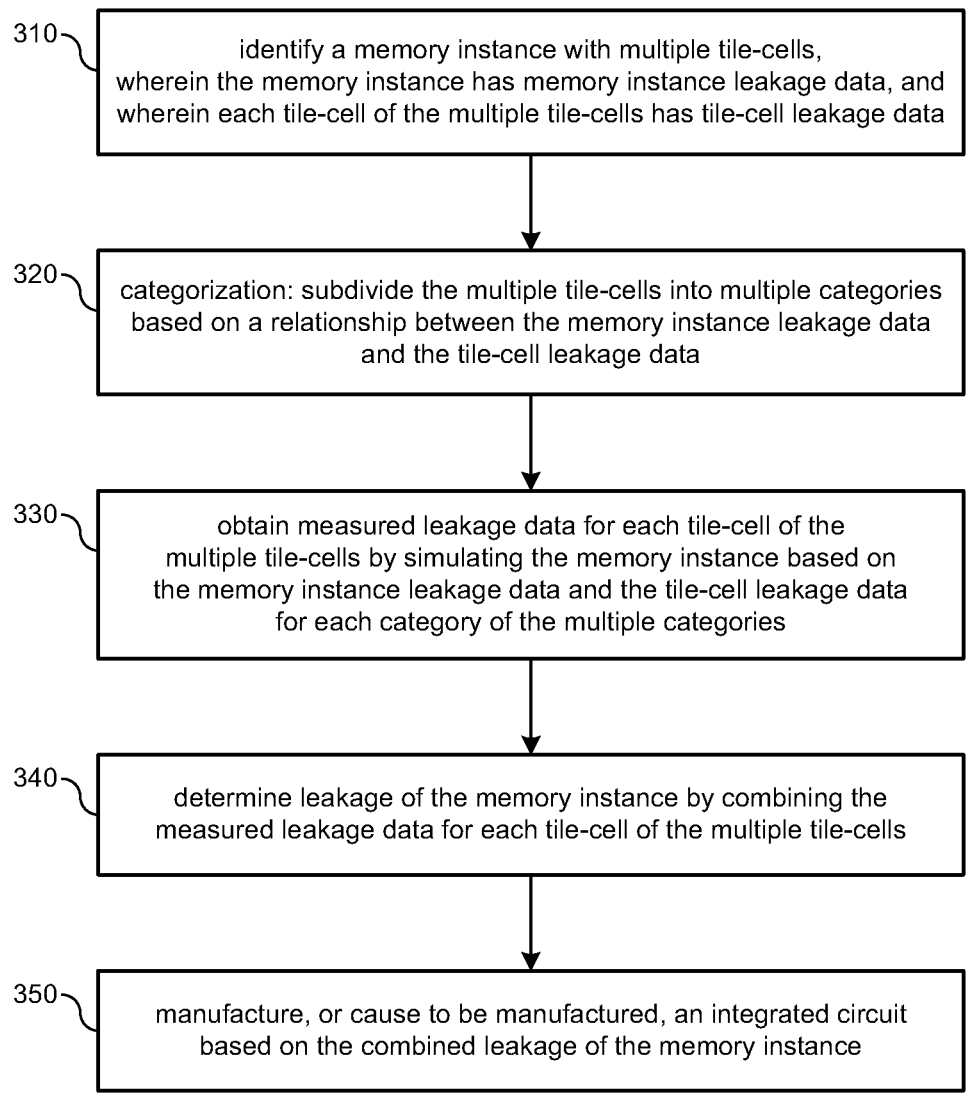
FIG. 3 illustrates a process diagram of a method for categorizing a memory instance in accordance with various implementations described herein.

FIG. 3 illustrates a process flow diagram of a method 300 for manufacturing an integrated circuit in accordance with various implementations described herein.

Figure 10:
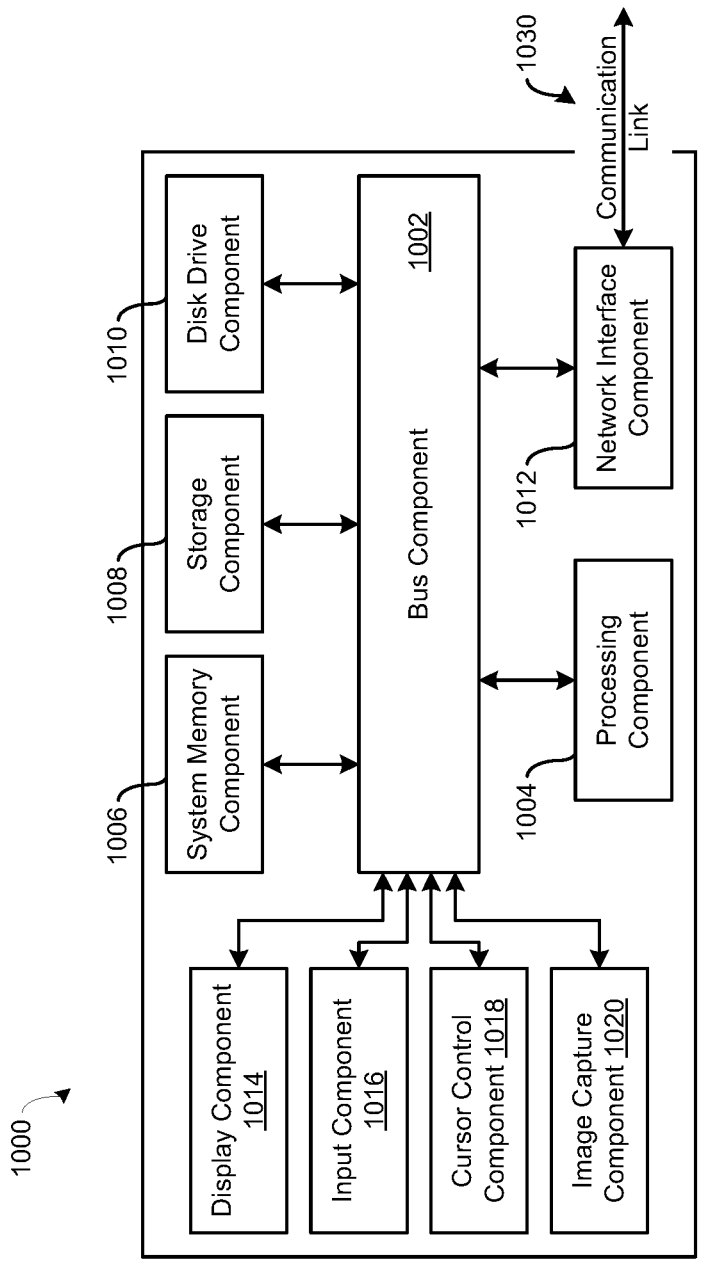
FIG. 10 illustrates a block diagram of a computing system in accordance with various implementations described herein.

It should be understood that even though method 300 may indicate a particular order of operation execution, in some cases, various certain portions of the operations may be executed in a different order, and on different systems. In other cases, additional operations and/or steps may be added to and/or omitted from method 300. Method 300 may be implemented in hardware and/or software. If implemented in hardware, method 300 may be implemented with various circuit components. If implemented in software, method 300 may be implemented as a program or software instruction process that may be configured for implementing tile-cell interpolation as described herein. If implemented in software, instructions related to implementing the method 300 may be stored in memory and/or a database. For instance, a computer or various other types of computing devices having a processor and memory (e.g., computer system 1000 as shown in FIG. 10) may be adapted and/or configured to perform method 300.

As described and shown in reference to FIG. 3, method 300 may be used for manufacturing an integrated circuit (IC) that implements memory instances derived from multiple categories in various types of applications. At block 310, method 300 may identify a memory instance with multiple tile-cells, wherein the memory instance has memory instance leakage data, and wherein each tile-cell of the multiple tile-cells has tile-cell leakage data. At block 320, method 300 may subdivide the multiple tile-cells into multiple categories based on a relationship between the memory instance leakage data and the tile-cell leakage data. In some instances, the multiple categories may be associated with one or more categorization groups of tile-cells, such as a first category (cat-1) of tile-cells, a second category (cat-2) of tile-cells, and a third category (cat-3) of tile-cells.

As described herein, the multiple categories may include the first category (cat-1) that refers to one or more types of tile-cells of the multiple tile-cells that are used once or multiple times in the memory instance, and the tile-cell leakage data may be non-static meaning dependent on its use context. Also, the multiple categories may include the second category (cat-2) that refers to one or more types of tile-cells of the multiple tile-cells that are used multiple times in the memory instance, and the tile-cell leakage data may be static meaning independent of its use context. Further, the multiple categories may include the third category (cat-3) that refers to one or more types of tile-cells of the multiple tile-cells that are used only once in the memory instance, and the tile-cell leakage data may be obtained by direct measurement.

At block 330, method 300 may obtain measured leakage data for each tile-cell of the multiple tile-cells by simulating the memory instance based on the memory instance leakage data and the tile-cell leakage data for each category of the multiple categories.

In some instances, measured leakage data for each tile-cell in the first category (cat-1) may be obtained by simulating the memory instance based on the memory instance leakage data and the tile-cell leakage data for the first category (cat-1). Also, measured leakage data for each tile-cell in the first category (cat-1) may be further obtained by determining the measured leakage data for the memory instance via interpolating the tile-cell leakage data for each tile-cell in the first category (cat-1) using the tile-cell leakage data for each category (cat-1, cat-2, cat-3) of the multiple categories.

In other instances, measured leakage data for each tile-cell in the second category (cat-2) may be obtained by simulating the memory instance based on the memory instance leakage data and the tile-cell leakage data for each tile-cell in the second category (cat-2). Also, measured leakage data for each tile-cell in the second category (cat-2) may be further obtained by determining an average measured leakage data for the memory instance via averaging the tile-cell leakage data for each tile-cell in the second category (cat-2).

Also, in other instances, measured leakage data for each tile-cell in the third category (cat-3) may be obtained by simulating the memory instance based on the memory instance leakage data and the tile-cell leakage data for each tile-cell in the third category (cat-3).

At block 340, method 300 may determine a combined leakage of the memory instance by combining the measured leakage data for each tile-cell of the multiple tile-cells. At block 350, method 300 may manufacture, or cause to be manufactured, an integrated circuit based on the combined leakage of the memory instance.

In various implementations, as shown in FIGS. 1B-1C, the memory instance may refer to a first memory instance, and identifying the memory instance with multiple tile-cells may refer to identifying the first memory instance with multiple tile-cells and a second memory instance with multiple tile-cells. Also, the first memory instance and the second memory instance may share one or more tile-cells of the multiple tile-cells.

In reference to categorization, various types of tile-cells in a memory instance may be classified into multiple categories, such as, e.g., 3 categories. For instance, the third category (cat-3) tile-cell type may be used only once and thus may have only one tile-cell instance in a memory instance. Thus, characterization of such a tile-cell type may not need interpolation or additional computation, and a static leakage measured may be sufficient to meet accuracy requirements.

The second category (cat-2) tile-cell type may have multiple tile instances in a memory instance with limited variation of characteristics among the multiple tile-cells in one instance. Characteristics of tile instances of such a tile type may not significantly vary when used in different memory instances. That is, the characteristics may not be sensitive to variations of placement, memory instance, charge/discharge path, input level, etc. For one or more or all tiles of such a type used in a memory instance, a static leakage obtained for the one or more or all the tile-cells that re-appear in the memory instance is sufficient to meet leakage accuracy requirements. Since the tile-cell may be used multiple times in a memory instance with little leakage variation (or the leakage being "static"), the average leakage may be computed after simulation to obtain static leakage data.

The first category (cat-1) tile-cell type may present different leakage when used in different tiles or memory instances. The different leakage may be caused by different placement in different instances, different charge and/or discharge paths, and resistance-capacitance (RC) behavior. Tiles of such a type are individually characterized and applied to a memory compiler using a particular interpolation scheme or technique.

In some instances, leakage characterization for medium-to-large size memory instances may be problematic, rather than small instances. In this instance, a small (or minimum) set of reference memory instances may be characterized to obtain the leakage of one or more or all possible tile-cells. In some instances, rather than probing for input voltage levels of each tile, leakage of each tile-cell may be measured directly in the context of a reference memory instance. The set of reference instances may include one or more or all possible tile-cell types. However, for some tile-cells that may be sensitive to memory instance size (e.g., bitcells and column cells) and for wordline drivers (e.g., when supply or virtual supply is floating), data from simulating the set of reference memory instances may accurately represent these tile-cells. Hence, additional memory instances may be used to model these tile-cells. In particular, a minimum set of reference instances may be first determined and characterized to cover one or more or all tile-cells whose leakage may not vary in different use cases. To optimize run-time and memory requirements for simulation, the selected reference memory instances may have small sizes. Then, a few taller instances with a small number of bits may be characterized to obtain the bitcell and wordline drivers variation across rows.

The leakage of some types of tile-cells (e.g., bitcell and wordline drivers) may be row-dependent, instead of having only one static value for the entire type. Therefore, an enhanced feature may be used to reach improved accuracy. In particular, reference tile-cell data may be first generated by using different reference memory instances with various numbers of rows. When the memory compiler generates leakage data for a given memory instance, the memory compiler may then retrieve reference tile-cell data from a database and interpolate the retrieved tile-cell data to obtain tile-cell data for the given memory instance. To generate a final leakage of the full memory instance, the data of one or more or all the tile-cells may be combined. Using various implementations described herein, the memory compiler may generate tile-cell leakage data with improved accuracy and without a noticeable cost increase.

Figure 4A:
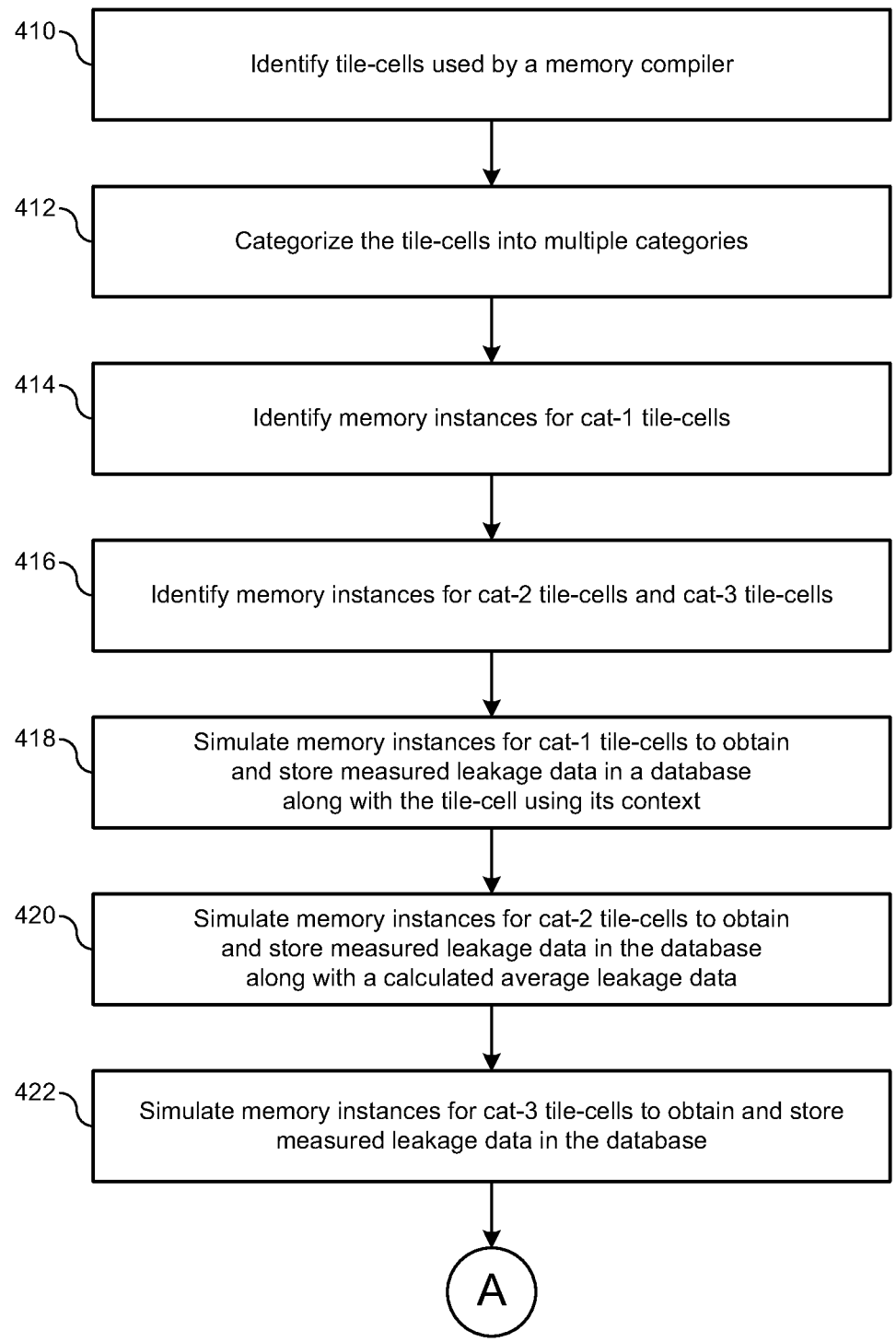
FIGS. 4A-4B illustrate a process diagram of another method for categorizing a memory instance in accordance with various implementations described herein.
Figure 4B:
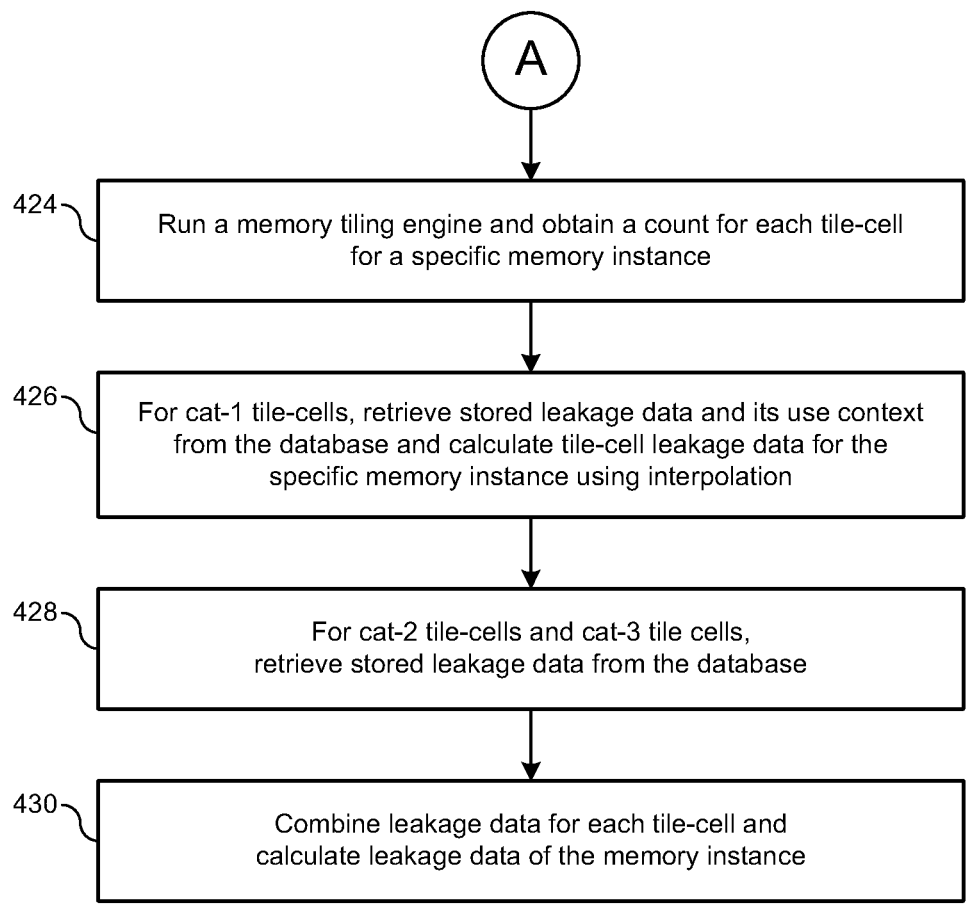

FIGS. 4A-4B illustrate a process diagram of a method 400 for categorizing a memory instance in accordance with various implementations described herein. Method 400 shows a first part of the process diagram, and FIG. 4B shows a second part of the process diagram that are linked with an encircled alpha-numeric character A.

It should be understood that even though method 400 may indicate a particular order of operation execution, in some cases, various certain portions of the operations may be executed in a different order, and on different systems. In other cases, additional operations and/or steps may be added to and/or omitted from method 400. Method 400 may be implemented in hardware and/or software. If implemented in hardware, method 400 may be implemented with various circuit components. If implemented in software, method 400 may be implemented as a program or software instruction process that may be configured for implementing tile-cell interpolation as described herein. If implemented in software, instructions related to implementing the method 400 may be stored in memory and/or a database. For instance, a computer or various other types of computing devices having a processor and memory (e.g., computer system 1000 as shown in FIG. 10) may be adapted and/or configured to perform method 400.

As described and shown in reference to FIGS. 4A-4B, method 400 may be used for developing an integrated circuit (IC) that implements memory instances derived from multiple categories in various types of applications. FIG. 4A shows process blocks 410 to 422, and FIG. 4B shows process blocks 424 to 430.

At block 410, method 400 may identify tile-cells used by a memory compiler. In some instances, method 400 may identify one or more or all tile-cells used by the memory compiler, such as, e.g., a memory compiler used in FIGS. 5-9. In other instances, the computer system 1000 of FIG. 10 may be used as a memory compiler.

At block 412, method 400 may categorize (subdivide or partition) the tile-cells into multiple categories. In some instances, the multiple categories may include a first category (cat-1) of tile-cells, a second category (cat-2) of tile-cells, and a third category cat-3) of tile-cells, as described herein.

At block 414, method 400 may identify memory instances for category 1 (cat-1) tile-cells. In some instances, method 400 may identify memory instances having row and/or column variation to cover category 3 (cat-3) tile-cells with leakage data varying with memory rows and/or columns.

At block 416, method 400 may identify memory instances for category 2 (cat-2) tile-cells and category 3 (cat-3) tile-cells. In some instances, method 400 may identify a minimum set (or reduced set) of small memory instances that cover one or more or all category 1 (cat-1) tile-cells and category 2 (cat-2) tile-cells.

At block 418, method 400 may simulate memory instances for the category 1 (cat-1) tile-cells to obtain and store measured leakage data in a database (or some other memory storage component) along with the tile-cell using its context. In some instances, in reference to category 1 (cat-1) tile-cells, method 400 may simulate memory instances to obtain measured leakage data of the tile-cells and store the leakage data in a database together with the tile-cell using its context.

At block 420, method 400 may simulate memory instances for the category 2 (cat-2) tile-cells to obtain and store measured leakage data in the database (or some other memory storage component) along with a calculated average leakage data. In some instances, in reference to category 2 (cat-2) tile-cells, method 400 may simulate memory instances to obtain measured leakage data of the tile-cells, calculate an average leakage data, and store the average leakage data in the database.

At block 422, method 400 may simulate memory instances for the category 3 (cat-3) tile-cells to obtain and store measured leakage data in the database (or some other memory storage component). In some instances, in reference to category 3 (cat-3) tile-cells, method 400 may simulate memory instances to obtain measured leakage data of the tile-cells and store the measured leakage data in the database.

Figure 5:
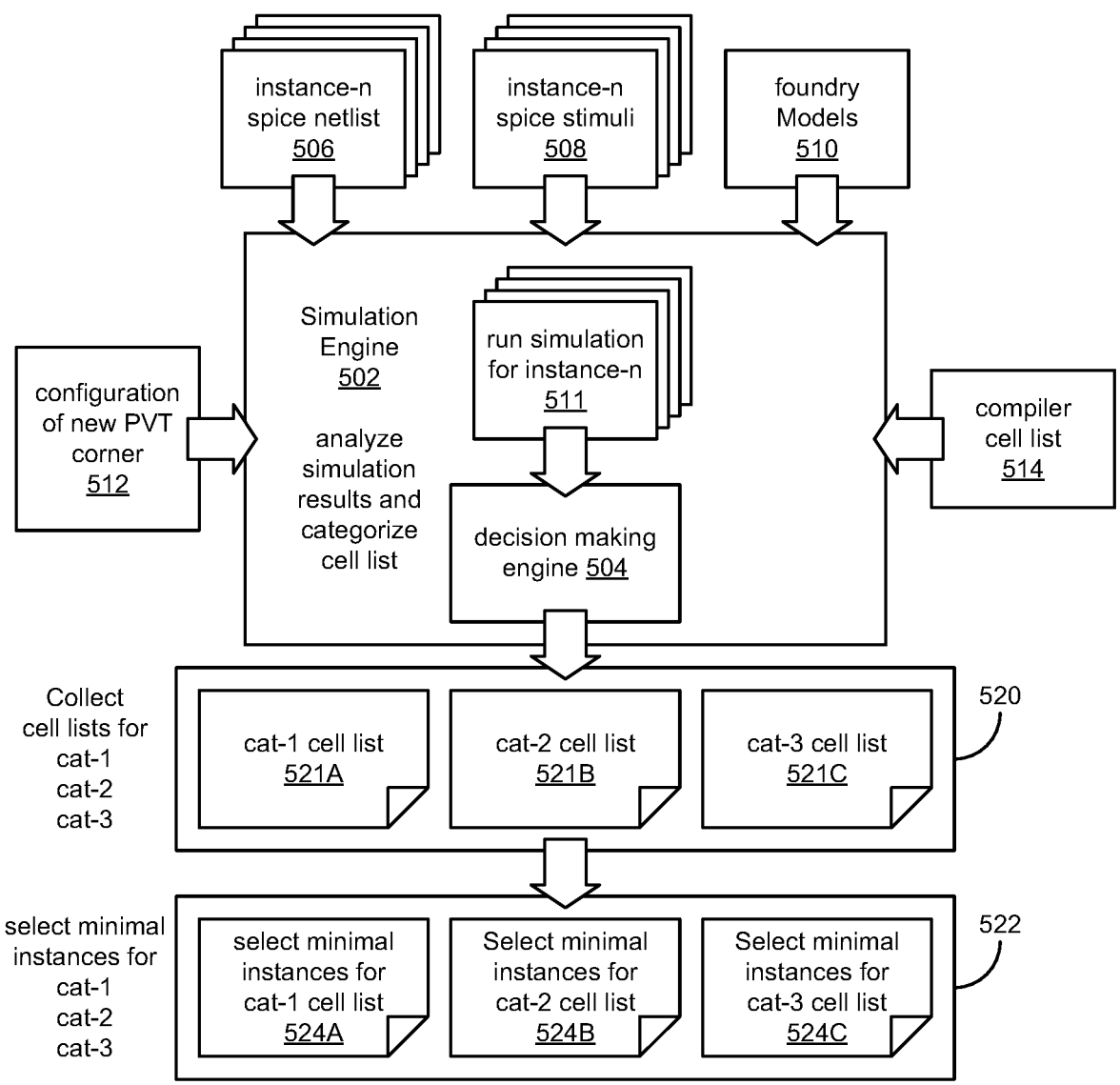
FIG. 5 illustrates a system block diagram for categorizing a memory instance in accordance with various implementations described herein.

At block 424, method 400 may run a memory tiling engine and obtain a count for each tile-cell for a specific memory instance. In some instances, method 400 may run the memory tiling engine (e.g., as shown in FIG. 5) and obtain the count of each tile-cell for a given memory instance (or for a specific memory instance). In some instances, the computer system 1000 of FIG. 10 may be used as a memory tiling engine.

At block 426, method 400 may retrieve stored leakage data and its use context from the database for category 1 (cat-1) tile-cells and calculate tile-leakage data for the specific memory instance associated with category 1 (cat-1) tile-cells using interpolation. In some instances, for category 3 (cat-3) tile-cells for the given memory instance (or for the specific memory instance), method 400 may retrieve leakage data and its use context from the database and then calculate tile-cell leakage data for the give memory instance (or for the specific memory instance) using interpolation.

At block 428, method 400 may retrieve stored leakage data from the database for category 2 (cat-2) tile-cells and category 3 (cat-3) tile-cells. At block 430, method 400 may combine leakage data for each tile-cell and calculate leakage data for the specific memory instance.

FIG. 5 illustrates a system block diagram 500 for categorizing a memory instance in accordance with various implementations described herein.

As shown in FIG. 5, a simulation engine 502 may run one or more simulations 511 for one or more memory instances-n (e.g., instances 0, 1, 2, . . . , n), and a decision making engine 504 may analyze simulation results and make decisions to categorize a tile-cell list. In some implementations, the simulation engine 502 receives various data and information, such as, e.g., spice netlist data and information 506 for the one or more memory instances (e.g., instances 0, 1, 2, . . . , n), spice stimuli data and information 508 for the one or more memory instances (e.g., instances 0, 1, 2, . . . , n), foundry model data and information 510, configuration data and information related to a new PVT (process, variation and temperature) corner 512 that may produce worse-case leakage, and a compiler tile-cell list 514.

The simulation engine 502 may receive the data and information 506, 508, 510, 512, 514, and the decision making engine 504 may be used to observe leakage measurement data and create categorized tile-cell lists 520 based on multiple categories, such as, e.g., the first category (cat-1) tile-cell list 521A, the second category (cat-2) tile-cell list 521B, and the third category (cat-3) tile-cell list 521C. In some implementations, from observed leakage measurement data, minimal instances for the multiple categories (cat-1, cat-2, cat-3) may be generated, wherein minimal instances may be selected for a first category (cat-1) tile-cell list 524A, a second category (cat-2) tile-cell list 524B, and a third category (cat-3) tile-cell list 524C.

Figure 6:
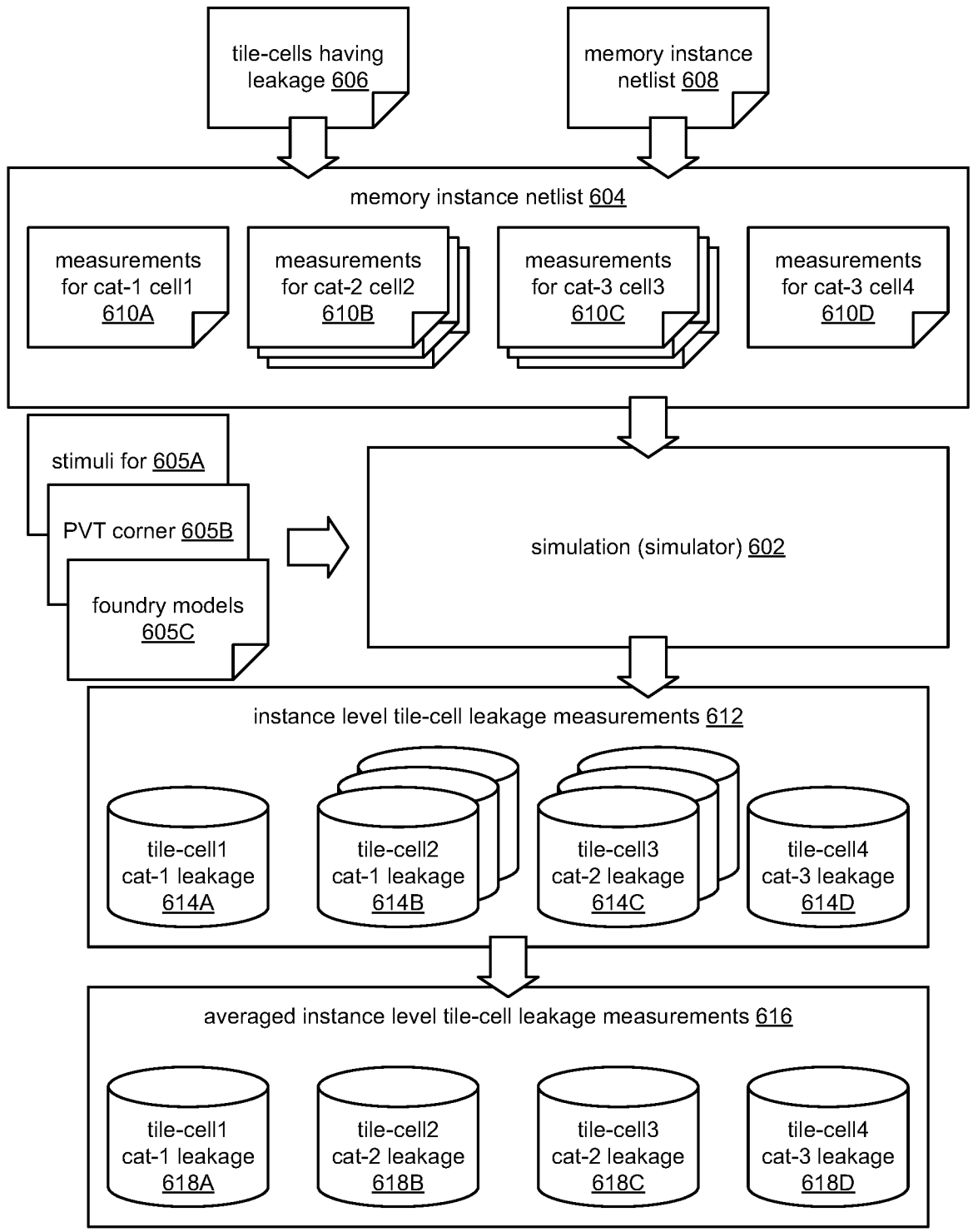
FIG. 6 illustrates a system block diagram for simulating a memory instance in accordance with various implementations described herein.

FIG. 6 illustrates a system block diagram 600 for simulating a memory instance in accordance with various implementations described herein.

As shown in FIG. 6, a simulation engine 602 may run simulations based on a memory instance netlist 604, stimuli for . . . 605A, PVT corner 605B, and foundry models 605C. The memory instance netlist 604 may receive data and information related to tile-cells that require leakage 606 and an input memory instance netlist 608 and provide a hierarchical representation of measurements for various categorized tile-cells, such as, e.g., one or more measurements for cat-1 cell1 610A, one or more measurements for cat-1 cell2 6106, one or more measurements for cat-2 cell3 610C, and further, one or more measurements for cat-3 cell4 610D. The memory instance netlist 604 may add leakage measurements inside each tile of the memory instance netlist. The simulation engine 602 may receive the data and information 604, 605A, 605B, 605C and provide instance level tile-cell leakage measurements 612, which includes various tile-cell leakage data, such as, e.g., data for cat-1 tile-cell1 614A, data for cat-1 tile-cell2 6146, data for cat-2 tile-cell3 614C, and further, data for cat-3 tile-cell4 614D. The instance level tile-cell leakage measurements 612 may refer to measurements for a flattened netlist for one or more or all tiles in a memory instance circuit. In some implementations, the instance level tile-cell leakage measurements 612 may be averaged in block 616 such that averaged data may be provided for cat-1 tile-cell1 618A, for cat-2 tile-cell2 6186, cat-2 tile-cell3 618C, and further, for cat-3 tile-cell4 618D. Thus, block 616 may be used to obtain average leakage of each tile to produce one leakage per tile per voltage domain.

Figure 7:
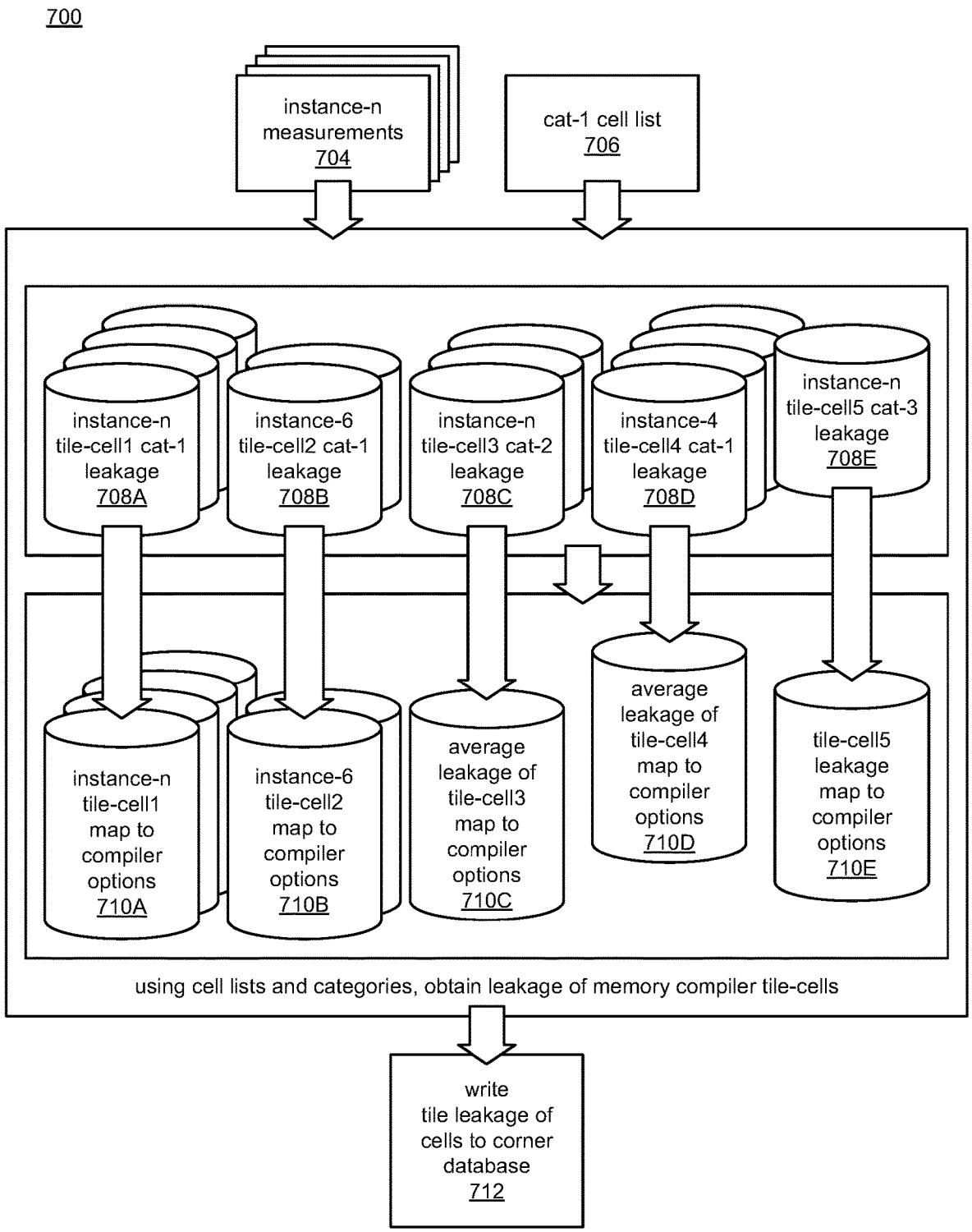
FIG. 7 illustrates a system block diagram for collecting tile-cell leakage data in accordance with various implementations described herein.

FIG. 7 illustrates a system block diagram 700 for collecting tile-cell leakage data in accordance with various implementations described herein. In some instances, a memory compiler (e.g., memory compiler 802 of FIG. 8 and/or memory compiler 902 of FIG. 9) may be used for collecting tile-cell leakage data as described in FIG. 7.

As shown in FIG. 7, a memory compiler may provide for database preparation and collecting tile-cell leakage data into a database. The memory compiler may receive measurement data and information 704 for one or more memory instances (e.g., instances 0, 1, 2, . . . , n) and data and information related to a first category (cat-1) tile-cell list. The measurements for the memory instances (e.g., instances 0, 1, 2, . . . , n) may refer to a minimal set of memory instances that are used for leakage characterization, and the memory compiler may gather (or collect) leakage measurements for processing and writing into a database.

Also, as shown, the memory compiler may receive the data and information 704, 706 and map memory instance leakage data to compiler options. For instance, the memory compiler may receive leakage data for instance-n cat-1 tile-cell1 708A, instance-6 cat-1 tile-cell2 708B, instance-n cat-2 tile-cell3 708C, instance-4 cat-1 tile-cell4 708D, and instance-n cat-3 tile-cell5 708E, and then the memory compiler may map this leakage data to compiler options. In this instance, the memory compiler may map leakage data for instance-n tile-cell1 710A, instance-6 tile-cell2 7106, average leakage of tile-cell3 710C, average leakage data of tile-cell4 710D, and tile-cell5 leakage 710E to one or more or all compiler options. Therefore, the memory compiler may use data and information related to cell lists and categories (cat-1, cat-2, cat-3) to obtain leakage data of one or more or all memory compiler tile-cells. The memory compiler may then process this data and information to write tile-cell leakage data of one or more or all tile-cells to a database, such as, e.g., a corner database.

Figure 8:
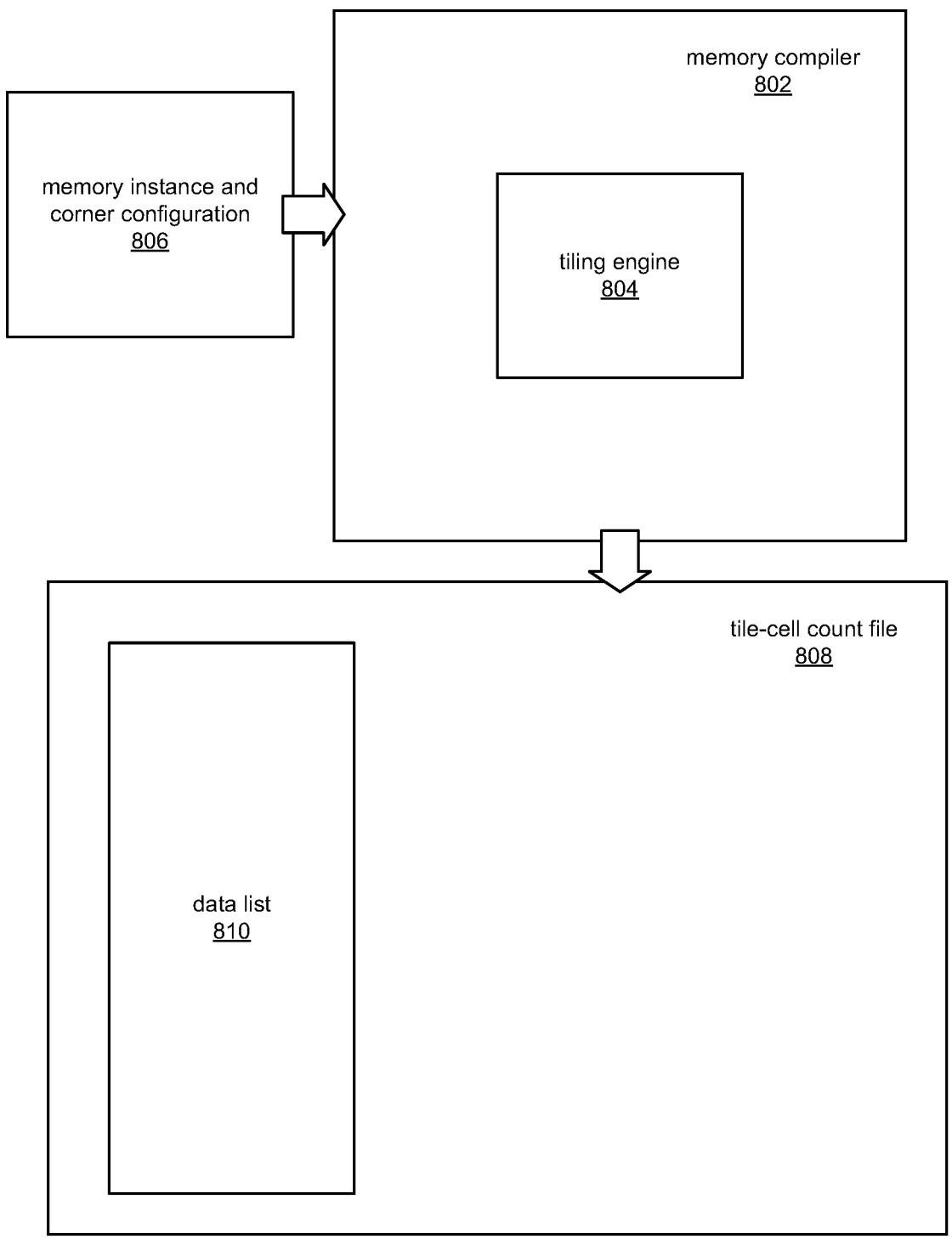
FIG. 8 illustrates a system block diagram for generating tile-cell count file for a memory instance in accordance with various implementations described herein.

FIG. 8 illustrates a system block diagram 800 for generating a tile-cell count file for a memory instance in accordance with implementations described herein.

As shown in FIG. 8, a memory compiler 802 having a tiling engine 804 may receive data and information related to a memory instance and a corner configuration 806 and provide (or generate) a tile-cell count file 808 with a data list 810. In some instances, the tiling engine 804 may be used to assemble one or more tile-cell blocks to create (or generate) memory instance circuitry. Further, various data and information related to the corner configuration 806 may include leakage measurement data of memory instance circuitry that is simulated and stored in a corner database.

In some implementations, the memory compiler 802 may be built with software and/or hardware to produce (create or generate) various hardware components that may be used to manufacture (or fabricate) an integrated circuit (IC) device, such as, e.g., memory circuitry associated with a memory instance. The memory compiler 802 may be capable of generating thousands of memory instances. Based on user required memory, configuration data/information may be provided to the memory compiler 802 to produce a specific memory instance. Along with memory circuitry, the memory compiler 802 may be capable of generating memory design views for integrating into various EDA (electronic design automation) tools. Memory leakage may be produced inside the memory design view with pre-simulated data/information stored in a database.

The memory compiler 802 may be capable of generating memory circuitry, EDA views, etc., and memory circuitry may be built with a library of building blocks, such as, e.g., bitcells, control blocks, decoders, sense amplifiers, etc., when configuration data and information for memory instances is provided to the memory compiler 802. The memory compiler 802 may operate as a software engine that may be used to tile the building blocks to create (or generate) a memory instance circuit. These building blocks may be extracted for resistance-capacitance (RC) and/or resistance-inductance-capacitance (RLC) usage in accurate circuit simulation.

Figure 9:
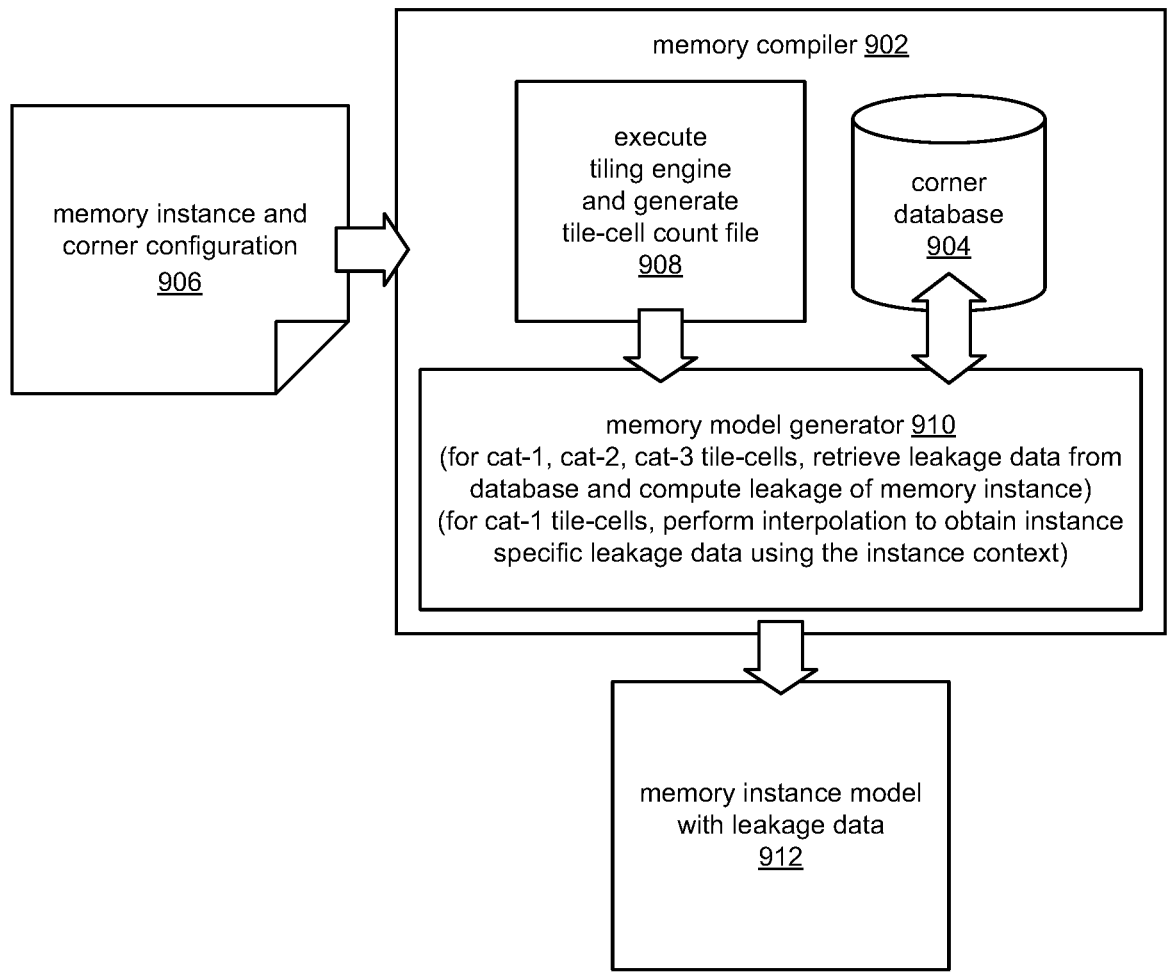
FIG. 9 illustrates a system block diagram of a memory compiler for creating memory instance leakage data in accordance with implementations described herein.

FIG. 9 illustrates a system block diagram of a memory compiler for creating memory instance leakage data in accordance with implementations described herein.

As shown in FIG. 9, a memory compiler 902 having a corner database 904 may receive data and information related to a memory instance and a corner configuration 906 and provide (or generate) a memory instance model with leakage data 912. In some instances, the memory compiler 902 may perform an operation 908 to execute a tiling engine and generate a tile-cell count file, as described in FIG. 8. The memory compiler 902 may include a memory model generator 910 that receives a tile-cell count file and communicates with the corner database 904 to provide (or generate) the memory instance model with leakage data 912. For the first category (cat-1) tile-cells, the second category (cat-2) tile-cells, and the third category (cat-3) tile-cells, the memory model generator 910 may retrieve leakage data from the corner database 904 (or other database) and compute the leakage of one or more memory instances. Also, for the first category (cat-1) tile-cells, the memory model generator 910 may perform interpolation to obtain instance specific leakage data using the instance context. In some implementations, various data and information related to a corner configuration may include leakage measurement data of memory instance circuitry that is simulated and stored in the corner database 904.

FIG. 10 illustrates a block diagram of a computing system 1000 in accordance with various implementations described herein.

As shown in FIG. 10, the computer system 1000 may includes a bus 1002 or other communication mechanism for communicating and/or transferring various data and information by interconnecting subsystems and components, such as, e.g., processing component 1004 (e.g., processor, micro-controller, digital signal processor (DSP), etc.), system memory component 1006 (e.g., RAM), static storage component 1008 (e.g., ROM), disk drive component 1010 (e.g., magnetic or optical), network interface component 1012 (e.g., modem or Ethernet card), display component 1014 (e.g., CRT or LCD), input component 1016 (e.g., keyboard), cursor control component 1018 (e.g., mouse or trackball), and image capture component 1020 (e.g., analog or digital camera). In one implementation, disk drive component 1010 may comprise a database having one or more disk drive components.

In accordance with implementations described herein, computer system 1000 performs specific operations by processor 1004 executing one or more sequences of one or more instructions contained in system memory component 1006. Such instructions may be read into system memory component 1006 from another computer readable medium, such as static storage component 1008 or disk drive component 1010. In other instances, hard-wired circuitry may be used in place of or in combination with software instructions to implement the present disclosure.

For instance, the computer system 1000 may be implemented with a special-purpose device having at least one processor 1004 and memory 1006, 1008, 1010 having stored thereon instructions that, when executed by the at least one processor 1004, cause the processor to perform one or more of the following process operations. For instance, the computer system 1000 may identify a memory instance with multiple tile-cells, wherein the memory instance has memory instance leakage data, and wherein each tile-cell of the multiple tile-cells has tile-cell leakage data. The computer system 1000 may subdivide the multiple tile-cells into multiple categories based on a relationship between the memory instance leakage data and the tile-cell leakage data. The computer system 1000 may obtain measured leakage data for each tile-cell of the multiple tile-cells by simulating the memory instance based on the memory instance leakage data and the tile-cell leakage data for each category of the multiple categories. Also, the computer system 1000 may determine combined leakage data of the memory instance by combining the measured leakage data for each tile-cell of the multiple tile-cells. In some instances, the computer system 1000 may also manufacture, or cause to be manufactured, an integrated circuit (IC) based on the combined leakage data of the memory instance.

Logic may be encoded in a computer readable medium, which may refer to any medium that participates in providing instructions to processor 1004 for execution. Such a medium may take many forms, including but not limited to, non-volatile media and volatile media. In various instances, non-volatile media includes optical or magnetic disks, such as disk drive component 1010, and volatile media includes dynamic memory, such as, e.g., system memory component 1006. Data and information related to execution instructions may be transmitted to computer system 1000 via a transmission media, such as in the form of acoustic or light waves, including those generated during radio wave and infrared data communications. Transmission media may include coaxial cables, copper wire, and fiber optics, including wires that comprise bus 1002.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various instances, execution of instruction sequences to practice the present disclosure may be performed by computer system 1000. In other instances, a plurality of computer systems 1000 coupled by communication link 1030 (e.g., network 160 of FIG. 1, such as a LAN, WLAN, PTSN, and/or various other wired or wireless networks, including telecommunications, mobile, and cellular phone networks) perform instruction sequences to practice the present disclosure in coordination with one another.

Computer system 1000 may transmit and receive messages, data, information and instructions, including one or more programs (i.e., application code) through communication link 1030 and communication interface 1012. Received program code may be executed by processor 1004 as received and/or stored in disk drive component 1010 or some other non-volatile storage component for execution.

Described herein are various implementations of a method. The method may include identifying a memory instance with multiple tile-cells. The memory instance may have memory instance leakage data, and each tile-cell of the multiple tile-cells may have tile-cell leakage data. The method may include subdividing the multiple tile-cells into multiple categories based on a relationship between the memory instance leakage data and the tile-cell leakage data. The method may include obtaining measured leakage data for each tile-cell of the multiple tile-cells by simulating the memory instance based on the memory instance leakage data and the tile-cell leakage data for each category of the multiple categories. The method may include determining a combined leakage of the memory instance by combining the measured leakage data for each tile-cell of the multiple tile-cells.

Described herein are various implementations of a device. The device may include a processor and a storage component having stored thereon instructions that, when executed by the processor, cause the processor to identify a memory instance with multiple tile-cells. The memory instance may have memory instance leakage data, and each tile-cell of the multiple tile-cells may have tile-cell leakage data. The instructions may cause the processor to subdivide the multiple tile-cells into multiple categories based on a relationship between the memory instance leakage data and the tile-cell leakage data. The instructions may cause the processor to obtain measured leakage data for each tile-cell of the multiple tile-cells by simulating the memory instance based on the memory instance leakage data and the tile-cell leakage data for each category of the multiple categories. The instructions may cause the processor to determine combined leakage data of the memory instance by combining the measured leakage data for each tile-cell of the multiple tile-cells.

Described herein are various implementations of an integrated circuit. The integrated circuit may include a first category of tile-cells arranged to provide core array circuitry. The integrated circuit may include a second category of tile-cells coupled to the first category of tile-cells. The second category of tile-cells may be arranged to provide read-write circuitry for accessing data stored in memory cells of the core array circuitry. The integrated circuit may include a third category of tile-cells coupled to the first category of tile-cells and the second category of tile-cells. The third category of tile-cells may be arranged to provide control circuitry for controlling access to the data stored in the memory cells of the core array circuitry and for controlling operation of the read-write circuitry. Also, a combination of the first category of tile-cells, the second category of tile-cells, and the third category of tile-cells pertain to a memory instance having a combined leakage associated with each tile-cell in each category of the combination.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   identifying a memory instance with multiple tile-cells, wherein the memory instance has memory instance leakage data, and wherein each tile-cell of the multiple tile-cells has tile-cell leakage data;
   subdividing the multiple tile-cells into multiple categories based on a relationship between the memory instance leakage data and the tile-cell leakage data;
   obtaining measured leakage data for each tile-cell of the multiple tile-cells by simulating the memory instance based on the memory instance leakage data and the tile-cell leakage data for each category of the multiple categories; and
   determining a combined leakage of the memory instance by combining the measured leakage data for each tile-cell of the multiple tile-cells.

2. The method of claim 1, further comprising:
   manufacturing, or causing to be manufactured, an integrated circuit based on the combined leakage of the memory instance.

3. The method of claim 1, wherein the multiple categories include a first category that refers to one or more types of tile-cells of the multiple tile-cells that are used once or multiple times in the memory instance and that refers to the tile-cell leakage data as being non-static meaning dependent on its use context.

4. The method of claim 3, wherein obtaining measured leakage data for each tile-cell in the first category comprises simulating the memory instance based on the memory instance leakage data and the tile-cell leakage data for the first category.

5. The method of claim 4, wherein obtaining measured leakage data for each tile-cell in the first category further comprises determining the measured leakage data for the memory instance via interpolating the tile-cell leakage data for each tile-cell in the first category using the tile-cell leakage data for each category of the multiple categories.

6. The method of claim 1, wherein the multiple categories include a second category that refers to one or more types of tile-cells of the multiple tile-cells that are used multiple times in the memory instance and that refers to the tile-cell leakage data as being static meaning independent of its use context.

7. The method of claim 6, wherein obtaining measured leakage data for each tile-cell in the second category comprises simulating the memory instance based on the memory instance leakage data and the tile-cell leakage data for each tile-cell in the second category.

8. The method of claim 7, wherein obtaining measured leakage data for each tile-cell in the second category further comprises determining an average measured leakage data for the memory instance via averaging the tile-cell leakage data for each tile-cell in the second category.

9. The method of claim 1, wherein the multiple categories include a third category that refers to one or more types of tile-cells of the multiple tile-cells that are used only once in the memory instance and that refers to the tile-cell leakage data as being obtained by direct measurement.

10. The method of claim 9, wherein obtaining measured leakage data for each tile-cell in the third category comprises simulating the memory instance based on the memory instance leakage data and the tile-cell leakage data for each tile-cell in the third category.

11. The method of claim 1, wherein the memory instance comprises a first memory instance, and wherein identifying the memory instance with multiple tile-cells comprises identifying the first memory instance with multiple tile-cells and a second memory instance with multiple tile-cells, and wherein the first memory instance and the second memory instance share one or more tile-cells of the multiple tile-cells.

12. A device, comprising:
a processor; and
a storage component having stored thereon instructions that, when executed by the processor, cause the processor to:
identify a memory instance with multiple tile-cells, wherein the memory instance has memory instance leakage data, and wherein each tile-cell of the multiple tile-cells has tile-cell leakage data;
subdivide the multiple tile-cells into multiple categories based on a relationship between the memory instance leakage data and the tile-cell leakage data;
obtain measured leakage data for each tile-cell of the multiple tile-cells by simulating the memory instance based on the memory instance leakage data and the tile-cell leakage data for each category of the multiple categories; and
determine combined leakage data of the memory instance by combining the measured leakage data for each tile-cell of the multiple tile-cells.

13. The device of claim 12, wherein the instructions further cause the processor to:
manufacture, or cause to be manufactured, an integrated circuit based on the combined leakage data of the memory instance.

14. An integrated circuit, comprising:
a first category of tile-cells arranged to provide core array circuitry;
a second category of tile-cells coupled to the first category of tile-cells, wherein the second category of tile-cells is arranged to provide read-write circuitry for accessing data stored in memory cells of the core array circuitry; and
a third category of tile-cells coupled to the first category of tile-cells and the second category of tile-cells, wherein the third category of tile-cells is arranged to provide control circuitry for controlling access to the data stored in the memory cells of the core array circuitry and for controlling operation of the read-write circuitry,
wherein a combination of the first category of tile-cells, the second category of tile-cells, and the third category of tile-cells pertain to a memory instance having a combined leakage associated with each tile-cell in each category of the combination.

15. The integrated circuit of claim 14, wherein the first category of tile-cells refers to one or more types of tile-cells that are used once or multiple times in the memory instance, and wherein tile-cell leakage data that is associated with the first category of tile-cells is non-static meaning dependent on its use context.

16. The integrated circuit of claim 15, wherein the tile-cell leakage data for each tile-cell in the first category is obtained by determining measured leakage data for the memory instance via interpolating the tile-cell leakage data for each tile-cell in the first category using tile-cell leakage data for each category of the combination.

17. The integrated circuit of claim 14, wherein the second category of tile-cells refers to one or more types of tile-cells that are used multiple times in the memory instance, and wherein the tile-cell leakage data is static meaning independent of its use context.

18. The integrated circuit of claim 17, wherein the tile-cell leakage data for each tile-cell in the second category is obtained by determining an average measured leakage data for the memory instance via averaging the tile-cell leakage data for each tile-cell in the second category.

19. The integrated circuit of claim 14, wherein the third category of tile-cells refers to one or more types of tile-cells that are used only once in the memory instance, and wherein the tile-cell leakage data is obtained by direct measurement.

20. The integrated circuit of claim 14, wherein the memory instance comprises multiple memory instances having a first memory instance and a second memory instance, and wherein the first memory instance and the second memory instance share one or more tile-cells.

\* \* \* \* \*